(12) United States Patent
Park

(10) Patent No.: US 9,841,062 B2
(45) Date of Patent: Dec. 12, 2017

(54) CLUTCH FOR VEHICLE

(71) Applicant: HYUNDAI MOTOR COMPANY, Seoul (KR)

(72) Inventor: Jong Yun Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/069,401

(22) Filed: Mar. 14, 2016

(65) Prior Publication Data

US 2017/0122381 A1    May 4, 2017

(51) Int. Cl.
| | | |
|---|---|---|
| F16D 13/38 | (2006.01) | |
| F16D 13/04 | (2006.01) | |
| F16D 13/28 | (2006.01) | |
| F16D 23/06 | (2006.01) | |
| F16D 125/34 | (2012.01) | |

(52) U.S. Cl.
CPC ............. *F16D 13/38* (2013.01); *F16D 13/28* (2013.01); *F16D 13/04* (2013.01); *F16D 2023/065* (2013.01); *F16D 2125/34* (2013.01)

(58) Field of Classification Search
USPC ...................................................... 192/53.31
See application file for complete search history.

(56) References Cited

U.S. PATENT DOCUMENTS

| | | | | |
|---|---|---|---|---|
| 2,410,511 A | * | 11/1946 | Letsinger | F16D 23/06 |
| | | | | 192/53.31 |
| 5,544,727 A | * | 8/1996 | Braun | F16D 23/06 |
| | | | | 192/48.91 |
| 8,469,168 B2 | * | 6/2013 | Park | F16D 23/06 |
| | | | | 192/53.361 |
| 2007/0029155 A1 | * | 2/2007 | Hiraiwa | F16D 23/025 |
| | | | | 192/53.31 |

FOREIGN PATENT DOCUMENTS

| | | |
|---|---|---|
| KR | 10-2005-0110317 A | 11/2005 |
| KR | 10-2007-0103867 A | 10/2007 |
| KR | 10-2007-0107610 A | 11/2007 |
| KR | 10-2008-0007766 A | 1/2008 |
| KR | 10-2012-0001427 A | 1/2012 |

OTHER PUBLICATIONS

Korean Office Action dated Mar. 15, 2017, issued in Korean patent application No. 10-2015-0154443.

* cited by examiner

*Primary Examiner* — Mark A Manley
(74) *Attorney, Agent, or Firm* — McDermott Will & Emery LLP

(57) ABSTRACT

A clutch for a vehicle includes a hub disposed on a rotary shaft such that a rotation thereof is restricted, a sleeve spline-coupled to an outer circumference of the hub, a clutch member disposed on the rotary shaft, and a clutch ring disposed between the clutch member and the hub, wherein the clutch ring is pressed against the clutch member by the sleeve and the hub, wherein the clutch ring comprises a pressed part to which an amount of force pressing against the clutch member is applied from the sleeve and the hub, the sleeve comprises pressing protrusions that transfer the axial driving force of the sleeve to the pressed part, and the hub comprises displacement converting portions that convert a relative rotational displacement with respect to the clutch ring into an axial linear displacement of the clutch ring.

8 Claims, 8 Drawing Sheets

[FIG.1]
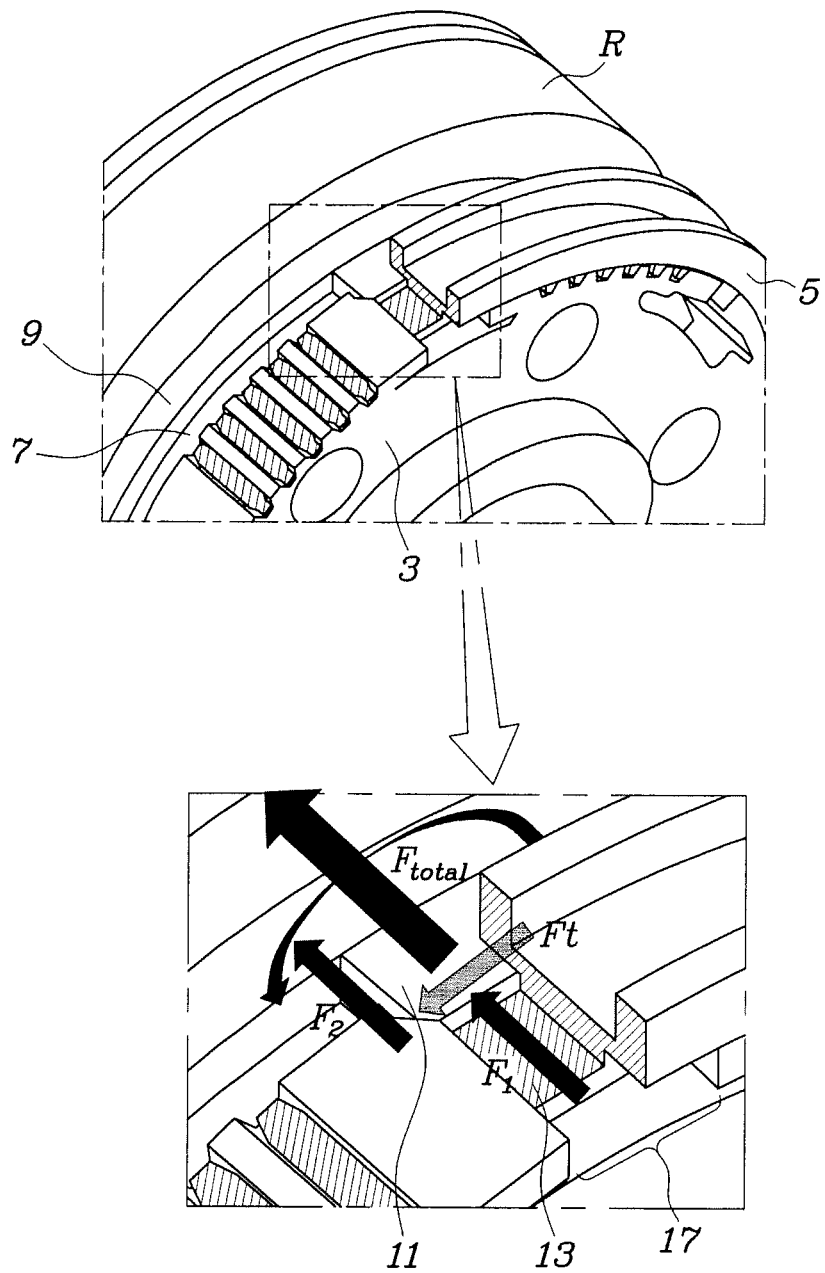

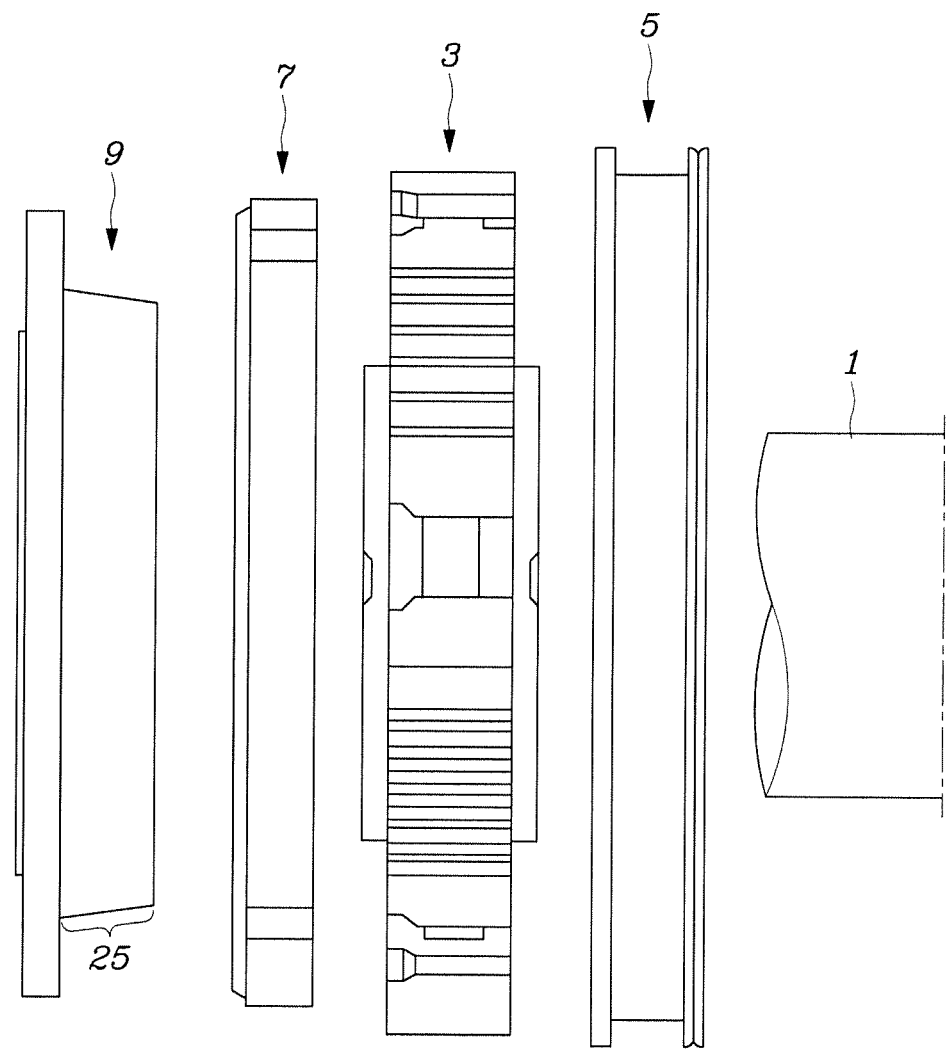
[FIG.2]

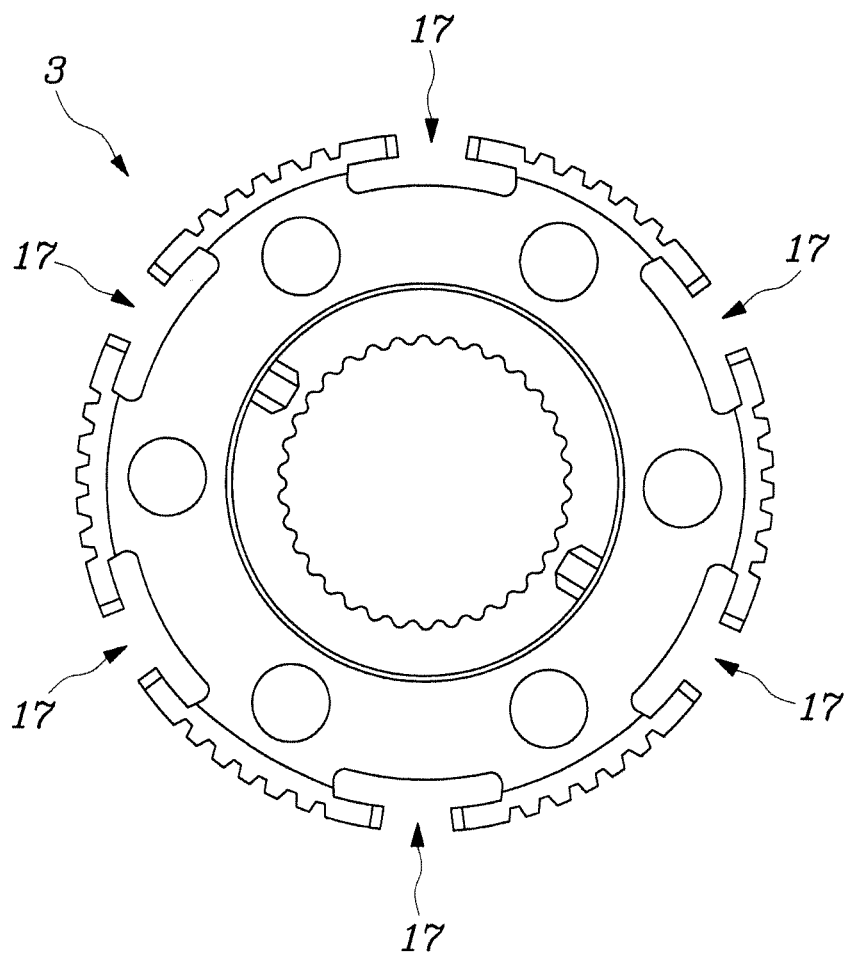
[FIG.3]

[FIG.4]
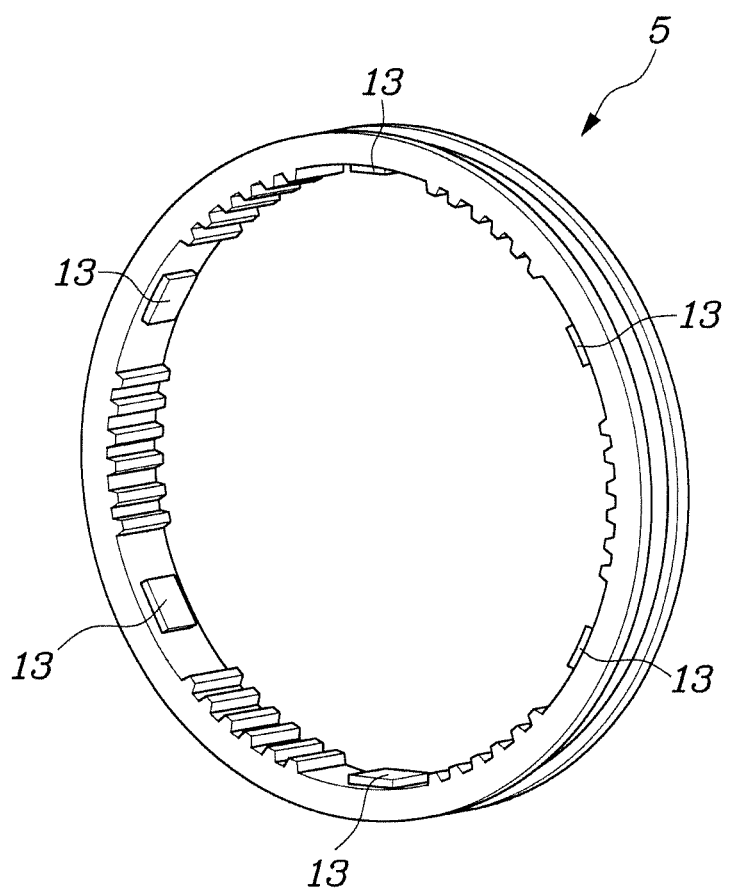

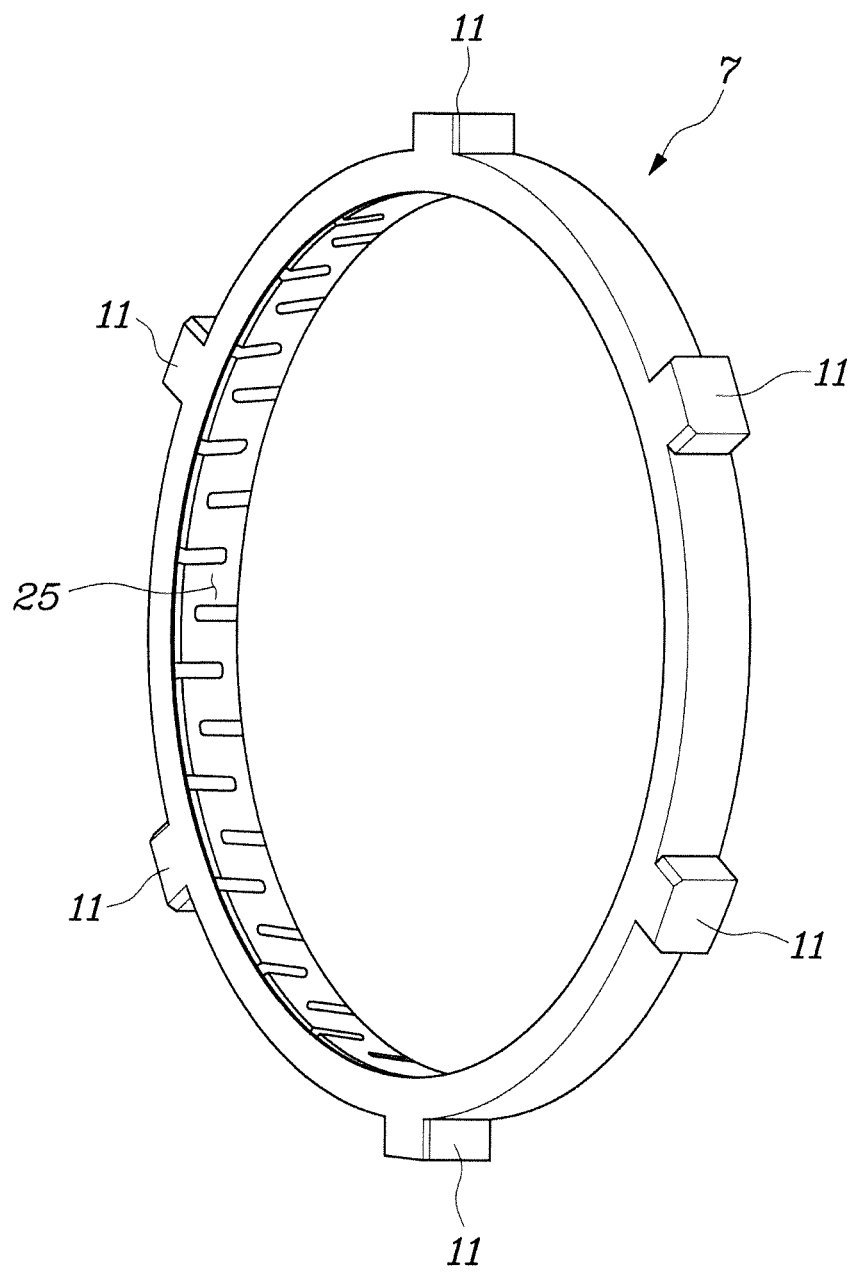
[FIG.5]

[FIG.6]
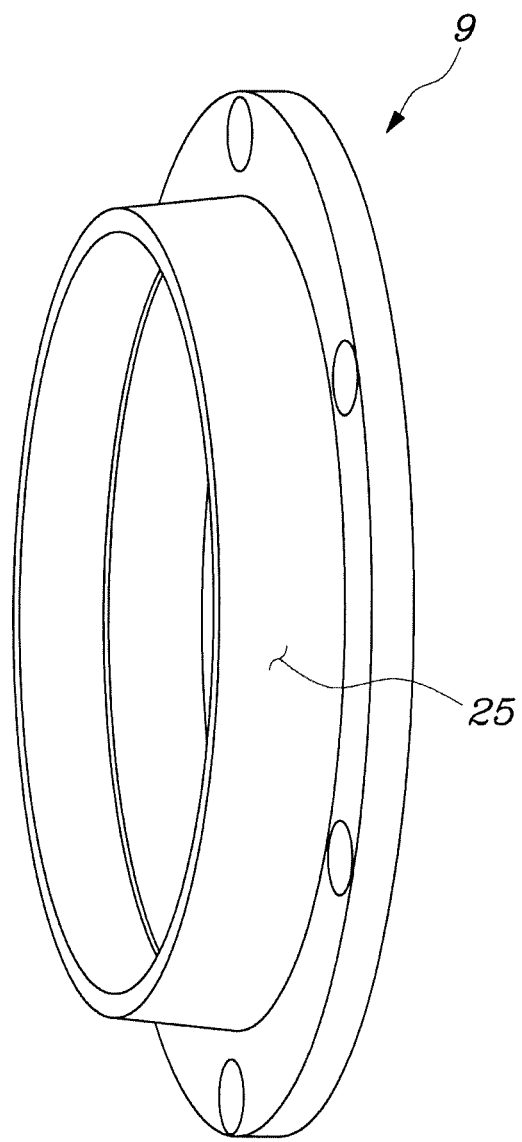

[FIG.7]
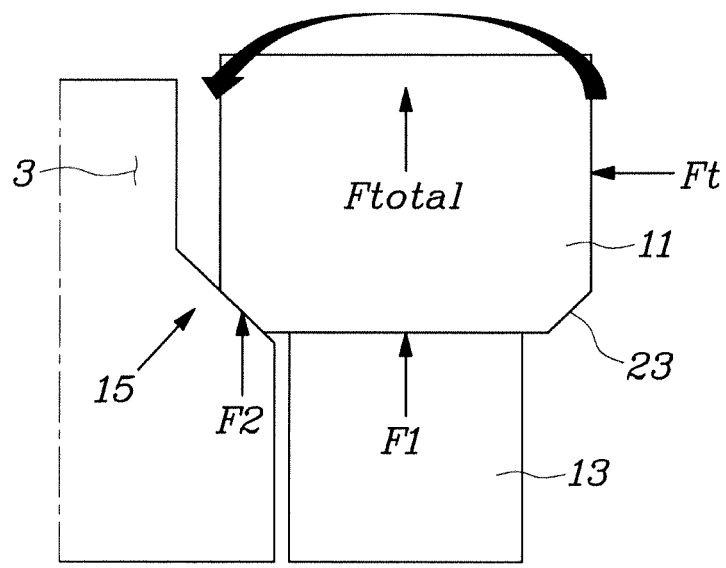
[FIG.8]
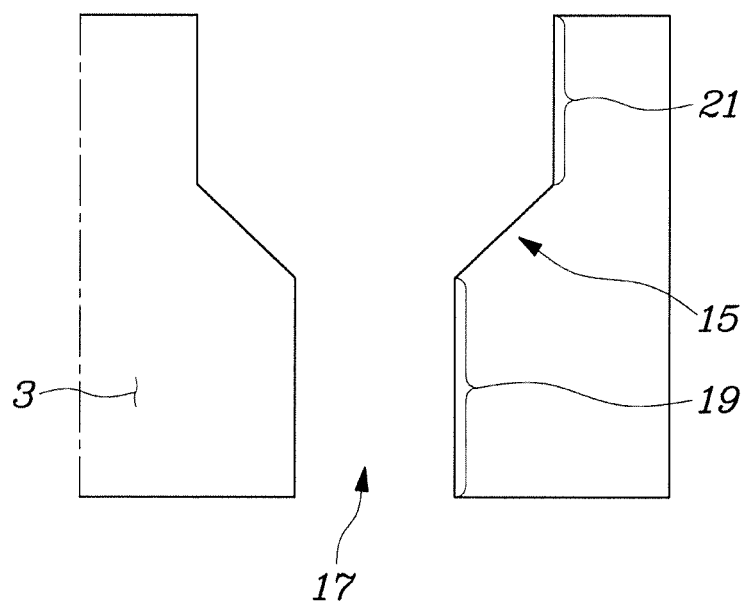

[FIG.9]
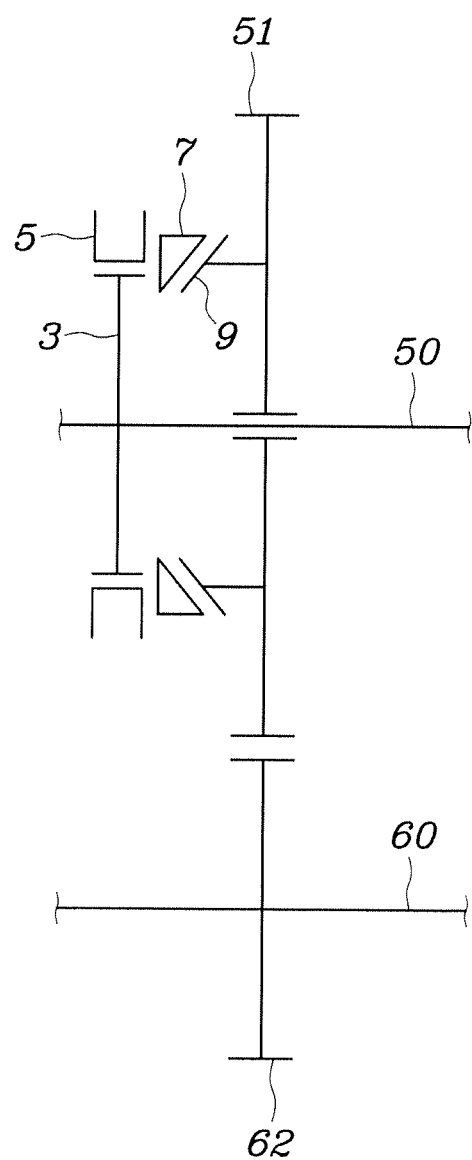

CLUTCH FOR VEHICLE

CROSS REFERENCE TO RELATED APPLICATION

The present application claims the benefit of priority to Korean Patent Application Number 10-2015-0154443, filed on Nov. 4, 2015 with the Korean Intellectual Property Office, the entire contents of which application are incorporated herein for all purposes by this reference.

TECHNICAL FIELD

The present disclosure generally relates to a clutch for a vehicle. More particularly, the present disclosure relates to a clutch for a vehicle being able to be used in a transmission of a vehicle.

BACKGROUND

A plurality of clutches is used in a transmission of a vehicle to control the transmission of power between rotary bodies that rotate relative to each other.

It is preferable that such a clutch has as small a volume as possible and a torque transmission capacity as large as possible. However, the volume of the clutch must generally be increased in order to obtain a larger torque transmission capacity.

In addition, in order to transmit a large amount of torque, the amount of force actuating the clutch must be increased. Thus, an apparatus for actuating the clutch, such as an actuator, is required to have a relatively larger size.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a clutch for a vehicle, the clutch being able to realize a relatively large torque transmission capacity while having a simple and compact configuration and a relatively small volume. The clutch can reduce the size and power of an actuator by reducing the amount of driving force of the clutch required to transmit torque. The clutch can transmit a relatively large amount of torque while the size of a clutch system is reduced as small as possible.

In order to achieve the above object, according to one aspect of the present disclosure, a clutch for a vehicle may include: a hub disposed on a rotary shaft such that a rotation thereof is restricted; a sleeve spline-coupled to the outer circumference of the hub such that the sleeve is able to linearly slide in a longitudinal direction of the rotary shaft; a clutch member disposed on the rotary shaft such that the clutch member and the rotary shaft are rotatable relative to each other; and a clutch ring disposed between the clutch member and the hub, wherein the clutch ring is pressed against the clutch member by the sleeve and the hub such that the clutch ring transmits torque using frictional force formed between the clutch ring and the clutch member. The clutch ring includes a pressed part to which an amount of force pressing against the clutch member is applied from the sleeve and the hub. The sleeve includes pressing protrusions that transfer the axial driving force of the sleeve to the pressed part. The hub includes displacement converting portions converting a relative rotational displacement with respect to the clutch ring into an axial linear displacement of the clutch ring.

The pressed part of the clutch ring may include pressed protrusions protruding radially outward from outer circumferential surfaces of the clutch ring. The pressing protrusions of the sleeve may protrude radially inward from inner circumferential surfaces of the sleeve. The hub may include accommodation recesses in which the pressed protrusions and the pressing protrusions are accommodated, the displacement converting portions being included in the accommodation recesses.

Each of the accommodation recesses of the hub may include a first recess into which a corresponding pressing protrusion among the pressing protrusions is fitted and a second recess into which a corresponding pressed protrusion among the pressed protrusions is fitted, the first recess and the second recess being connected by a corresponding displacement converting portion among the displacement converting portions.

The width of the second recess in the radial direction of the hub may be greater than the width of the first recess in the radial direction of the hub. The displacement converting portion may include inclined surfaces, the width of which gradually increasing from the first recess toward the second recess.

Each of the pressed protrusions of the clutch ring may have chamfered portions parallel to the inclined surfaces of the displacement converting portion. The radial width of the second width may be greater than the radial width of the pressed protrusion.

The chamfered portions of the pressed protrusion may remain in surface contact with the inclined surfaces of the displacement converting portion even in the case in which the clutch ring is in closest contact with the clutch member.

A plurality of the pressed protrusions, a plurality of the pressing protrusions, and a plurality of the accommodation recesses may be symmetrically arranged in the radial direction of the hub.

The clutch ring may include a clutch surface, and the clutch member may include a clutch surface. The clutch surface of the clutch ring and the clutch surface of the clutch member overlap each other, thereby generating the frictional force.

According to the present disclosure, the clutch for a vehicle can realize a relatively large torque transmission capacity while having a simple and compact configuration and a relatively small volume. The clutch can reduce the size and power of an actuator by reducing the amount of driving force of the clutch required to transmit torque. The clutch can transmit a relatively large amount of torque while the size of a clutch system is reduced as small as possible.

BRIEF DESCRIPTION OF THE DRAWINGS

The above and other objects, features and advantages of the present disclosure will be more clearly understood from the following detailed description when taken in conjunction with the accompanying drawings, in which:

FIG. 1 is a perspective view illustrating a clutch for a vehicle according to an exemplary embodiment of the present disclosure;

FIG. 2 is an exploded view illustrating components of the clutch illustrated in FIG. 1;

FIG. 3 is a side elevation view of a hub;

FIG. 4 is a perspective view of a sleeve;

FIG. 5 is a perspective view of a clutch ring;

FIG. 6 is a perspective view of a clutch member;

FIG. 7 is a schematic view illustrating an operation of a displacement converting portion according to the present disclosure;

FIG. 8 is a detailed view of an accommodation recess of a hub; and

FIG. 9 is an exemplary diagram to which the present disclosure is applied.

DETAILED DESCRIPTION OF THE DISCLOSURE

Reference will now be made in greater detail to an exemplary embodiment of the present disclosure, an example of which is illustrated in the accompanying drawings. Wherever possible, the same reference numerals will be used throughout the drawings and the description to refer to the same or like parts.

Referring to FIGS. 1 to 8, a clutch for a vehicle according to an exemplary embodiment of the present disclosure may include: a hub 3 disposed on a rotary shaft 1 such that the rotation thereof is restricted; a sleeve 5 spline-coupled to the outer circumference of the hub 3 such that the sleeve 5 can linearly slide in the longitudinal direction of the rotary shaft (hereinafter referred to as the "axial direction"); a clutch member 9 disposed on the rotary shaft 1 such that the clutch member 9 and the rotary shaft 1 can rotate relative to each other; and a clutch ring 7 disposed between the clutch member 9 and the hub 3. The clutch ring 7 may be pressed against the clutch member 9 by the sleeve 5 and the hub 3 such that the clutch ring 7 transmits torque using frictional force formed between the clutch ring 7 and the clutch member 9.

That is, the hub 3 and the sleeve 5 may always rotate integrally with the rotary shaft 1, and the clutch member 9 may be rotatable relative to these components. In this configuration, a torque transmission state may be changed by the clutch function between the clutch ring 7 and the clutch member 9.

The clutch member 9 can be connected to a rotary body R, such as a gear, that can rotate relative to the rotary shaft 1, the hub 3 and the sleeve 5. Consequently, a clutch function realized by the clutch member 9 and the clutch ring 7 can change a torque transmission state between a first group including the rotary shaft 1, the hub 3 and the sleeve 5 and a second group including the clutch member 9 and the rotary body R.

Although the clutch ring 7 rotates in concert with the hub 3 and the sleeve 5, the clutch ring 7 may be movable in the axial direction in the direction of the clutch member 9 while being rotatable relative to the hub 3 and the sleeve 5 to a small angular degree. With this configuration, the clutch ring 7 can perform the major function of changing the torque transmission state.

The clutch ring 7 has a pressed part to which an amount of force pressing against the clutch member 9 is applied from the sleeve 5 and the hub 3. The sleeve 5 has pressing protrusions 13 that transfer the axial driving force of the sleeve 5 to the pressed part. The hub 3 has displacement converting portions 15 converting a relative rotational displacement with respect to the clutch ring 7 into an axial linear displacement of the clutch ring 7.

According to a present embodiment, the pressed part of the clutch ring 7 includes pressed protrusions 11 protruding radially outward from the outer circumferential surfaces of the clutch ring 7. The pressing protrusions 13 of the sleeve 5 protrude radially inward from the inner circumferential surfaces of the sleeve 5. The hub 3 has accommodation recesses 17 in which the pressed protrusions 11 and the pressing protrusions 13 are accommodated. The displacement converting portions 15 are included in the accommodation recesses 17.

Each of the accommodation recesses 17 of the hub 3 may be configured such that a first recess 19 into which a corresponding pressing protrusion 13 is fitted and a second recess 21 into which a corresponding pressed protrusion 11 is fitted are connected via a corresponding displacement converting portion 15.

The accommodation recesses 17 may be formed in the outer circumferential surfaces of the hub 3, and the pressing protrusions 13 of the sleeve 5 and the pressed protrusions 11 of the clutch ring 7 may be fitted into the accommodation recesses 17, such that the pressing protrusions 13 and the pressed protrusions 11 can move in the axial direction.

Thus, when the sleeve 5 is moved in the axial direction by a predetermined amount of driving force supplied by an actuator, the pressing protrusions 13 directly transmit the driving force to the pressed protrusions 11, whereby the pressed protrusions 11 move in the axial direction. This consequently increases the amount of torque transmitted during pressing of the clutch ring 7 against the clutch member 9.

The width of the second recess 21 in the circumferential direction of the hub 3 may be greater than the width of the first recess 19. Each of the displacement converting portions 15 may be formed as a pair of inclined surfaces, the width of which gradually increases from the first recess 19 to the second recess 21.

Each of the pressed protrusions 11 of the clutch ring 7 may have chamfered portions 23 that are inclined to be parallel with the inclined surfaces of the displacement converting portion 15. The width of the second recess 21 in the circumferential direction may be formed to be greater than the width of the pressed protrusion 11 in the circumferential direction.

The inclined surfaces of the displacement converting portions 15 and the chamfered portions 23 of the pressed protrusions 11 serve to additionally increase the driving force of the actuator transmitted to the pressed protrusions 11 via the pressing protrusions 13 of the sleeve 5.

The principle in which the driving force is increased will be discussed with reference to FIG. 7. When driving force F1 from the actuator is applied to the pressed protrusions 11 via the pressing protrusions 13, the clutch ring 7 may start to transmit torque to the clutch member 9 due to frictional force Ft while being in contact with the clutch member 9, whereby the hub 3 and the clutch 7 have a relative rotational displacement.

In the case of FIG. 7, the clutch ring 7 has a relative rotational displacement with respect to the hub 3 due to the frictional force Ft directed to the left. Consequently, the chamfered portions 23 of the pressed protrusion 11 remaining in contact with the inclined surfaces of the displacement converting portion 15 are subjected to upwardly-driving force F2, which is combined with the driving force F1, thereby forming Ftotal.

That is, the behavior of the chamfered portions 23 with respect to the inclined surfaces of the displacement converting portion 15 may result in the pressed protrusion 11 moving in the axial direction toward the clutch member 9.

This consequently acts as additional driving force to bring the clutch ring 7 into close contact with the clutch member 9.

It is thereby possible to realize a large torque transmission capacity using an actuator having, and/or using, less power than that of the related art.

Even in the case in which the clutch ring 7 is in closest contact with the clutch member 9, the chamfered portions 23 of the pressed protrusion 11 are required to remain in surface contact with the inclined surfaces of the displacement converting portion 15 such that the displacement converting portion 15 can continuously realize the driving force-increasing function.

Thus, even in the case in which the clutch ring 7 is in closest contact with the clutch member 9, it is required that the pressed protrusions 11 to be spaced apart from both radial side surfaces of the second recesses 21.

It is preferable that a plurality of pressed protrusions 11, a plurality of pressing protrusions 13, and a plurality of accommodation recesses 17 are symmetrically arranged in the radial direction of the hub 3 since uniform pressure in the radial direction of the clutch ring 7 can be applied.

It is preferable that the clutch ring 7 has a radial clutch surface 25, and the clutch member 9 has a radial clutch surface 25 such that the radial clutch surfaces 25 of the clutch ring 7 and the clutch member 9 overlap each other, thereby generating the frictional force. This configuration can afford a larger torque transmission capacity than a clutch surface formed as a simple plane.

For reference, FIG. 9 illustrates a part of a transmission to which the clutch according to the present disclosure as configured above is applied. The clutch member 9 rotatably disposed on a first rotary shaft 50 is connected integrally to a first gear 51, which is meshed with a second gear 62 of a second rotary shaft 60. For example, rotational force from the first rotary shaft 50 is transmitted to the clutch member 9 via the hub 3, the sleeve 5, and the clutch ring 7. This consequently allows the second gear 62 to be driven via the first gear 51, whereby power can be transmitted to the second rotary shaft 60.

Although the exemplary embodiments of the present disclosure have been described for illustrative purposes, a person skilled in the art will appreciate that various modifications, additions and substitutions are possible, without departing from the scope and spirit of the present disclosure as disclosed in the accompanying claims.

What is claimed is:

1. A clutch for a vehicle comprising: a hub disposed on a rotary shaft such that a rotation thereof is restricted; a sleeve spline-coupled to an outer circumference of the hub such that the sleeve is able to linearly slide in a longitudinal direction of the rotary shaft; a clutch member disposed on the rotary shaft such that the clutch member and the rotary shaft are rotatable relative to each other; and a clutch ring disposed between the clutch member and the hub, wherein the clutch ring is pressed against the clutch member by the sleeve and the hub such that the clutch ring transmits torque using frictional force formed between the clutch ring and the clutch member, wherein the clutch ring comprises a pressed part to which an amount of force pressing against the clutch member is applied from the sleeve and the hub, the sleeve comprises pressing protrusions that transfer the axial driving force of the sleeve to the pressed part, and the hub comprises displacement converting portions that convert a relative rotational displacement with respect to the clutch ring into an axial linear displacement of the clutch ring, the clutch ring and the clutch member not having any part being meshed with the sleeve, and transmitting of torque in a full engagement state of the clutch between the hub and the clutch member is implemented and maintained only by the frictional force between the clutch ring and the clutch member, and the torque transmitted between the hub and the clutch member varies continuously according to a controlling of the frictional force between the clutch ring and the clutch member by changing of the frictional force from the pressing protrusions of the sleeve to the pressed part of the clutch ring.

2. The clutch for a vehicle according to claim 1, wherein the pressed part of the clutch ring comprises pressed protrusions protruding radially outward from outer circumferential surfaces of the clutch ring, the pressing protrusions of the sleeve protrude radially inward from inner circumferential surfaces of the sleeve, and the hub comprises accommodation recesses in which the pressed protrusions and the pressing protrusions are accommodated, the displacement converting portions being included in the accommodation recesses.

3. The clutch for a vehicle according to claim 2, wherein each of the accommodation recesses of the hub comprises a first recess into which a corresponding pressing protrusion among the pressing protrusions is fitted and a second recess into which a corresponding pressed protrusion among the pressed protrusions is fitted, the first recess and the second recess being connected by a corresponding displacement converting portion among the displacement converting portions.

4. The clutch for a vehicle according to claim 3, wherein a width of the second recess in a circumferential direction of the hub is greater than a width of the first recess in the circumferential direction of the hub, and the displacement converting portion comprises inclined surfaces, a width of which gradually increases from the first recess toward the second recess.

5. The clutch for a vehicle according to claim 4, wherein each of the pressed protrusions of the clutch ring has chamfered portions parallel to the inclined surfaces of the displacement converting portion, and a radial width of the second recess is greater than a radial width of the pressed protrusion.

6. The clutch for a vehicle according to claim 5, wherein the chamfered portions of the pressed protrusion remain in surface contact with the inclined surfaces of the displacement converting portion even in a case in which the clutch ring is in closest contact with the clutch member.

7. The clutch for a vehicle according to claim 2, wherein a plurality of pressed protrusions, a plurality of the pressing protrusions, and a plurality of the accommodation recesses are symmetrically arranged in a radial direction of the hub.

8. The clutch for a vehicle according to claim 1, wherein the clutch ring comprises a clutch surface, and the clutch member comprises a clutch surface, the clutch surface of the clutch ring and the clutch surface of the clutch member overlapping each other and generating the frictional force.

* * * * *